United States Patent [19]

Sigmundstad

[11] Patent Number: 5,697,732
[45] Date of Patent: Dec. 16, 1997

[54] SYSTEM FOR OFFSHORE PRODUCTION OF HYDROCARBONS

[75] Inventor: Martin Sigmundstad, Hafrsfjord, Norway

[73] Assignee: Den Norske Stats Oljeselskap A.S., Stavanger, Norway

[21] Appl. No.: 578,637

[22] PCT Filed: Jul. 5, 1994

[86] PCT No.: PCT/NO94/00119

§ 371 Date: May 3, 1996

§ 102(e) Date: May 3, 1996

[87] PCT Pub. No.: WO95/01904

PCT Pub. Date: Jan. 19, 1995

[30] Foreign Application Priority Data

Jul. 6, 1993 [NO] Norway ................... 932460

[51] Int. Cl.⁶ ................... B65B 3/08; F16L 1/14
[52] U.S. Cl. ................... 405/169; 166/345; 141/279
[58] Field of Search ................... 405/169–171, 405/224; 166/344, 345, 347; 141/279, 387, 388

[56] References Cited

U.S. PATENT DOCUMENTS

| | | | |
|---|---|---|---|
| 4,102,142 | 7/1978 | Lee | 405/171 X |
| 4,478,586 | 10/1984 | Gentry et al. | 141/388 X |
| 4,604,961 | 8/1986 | Ortloff et al. | 114/230 |
| 4,647,076 | 3/1987 | Pollack et al. | 285/95 |
| 4,925,219 | 5/1990 | Pollack et al. | 285/95 |
| 5,143,483 | 9/1992 | Petersen | 405/169 X |

FOREIGN PATENT DOCUMENTS

| | | |
|---|---|---|
| 38520/85 | 4/1986 | Australia . |
| 0 144 110 | 6/1985 | European Pat. Off. . |
| 0 150 591 | 8/1985 | European Pat. Off. . |
| 0 154 395 | 9/1985 | European Pat. Off. . |
| 150750 | 9/1984 | Norway . |
| 171009 | 10/1992 | Norway . |
| 1 557 108 | 12/1979 | United Kingdom . |
| 2 132 726 | 7/1984 | United Kingdom . |
| 2 163 505 | 2/1986 | United Kingdom . |
| WO 93/24731 | 12/1993 | WIPO . |
| WO 93/24732 | 12/1993 | WIPO . |

*Primary Examiner*—Tamara L. Graysay
*Assistant Examiner*—Tara L. Mayo
*Attorney, Agent, or Firm*—Foley & Lardner

[57] ABSTRACT

A system for offshore production of hydrocarbons via a vessel arranged for quick connection to and disconnection from a submerged body. The system comprises an outer buoyancy member for introduction and releasable securing in a submerged downwardly open receiving space in the vessel, and a center member which is rotatably mounted in the outer member and is anchored to the sea bed and is connected to at least one riser extending between a production well and the vessel. A swivel device is arranged at the upper end of the buoy for interconnection and transfer of process fluid between the risers and a tube system on the vessel. The swivel device comprises an outer female member permanently fastened to the center member of the buoy with its opening coaxial with the center member, and an inner male member which may be lowered into and raised from the female member via an operator on the vessel. When connected, the swivel members define common annular spaces communicating with associated fluid paths in the swivel members. Seals are provided on each side of the annular spaces and can be activated to form a seal between the annular spaces during operation. The seal can be relieved when the swivel members are disconnected.

21 Claims, 10 Drawing Sheets

Fig.10.
Fig.11.
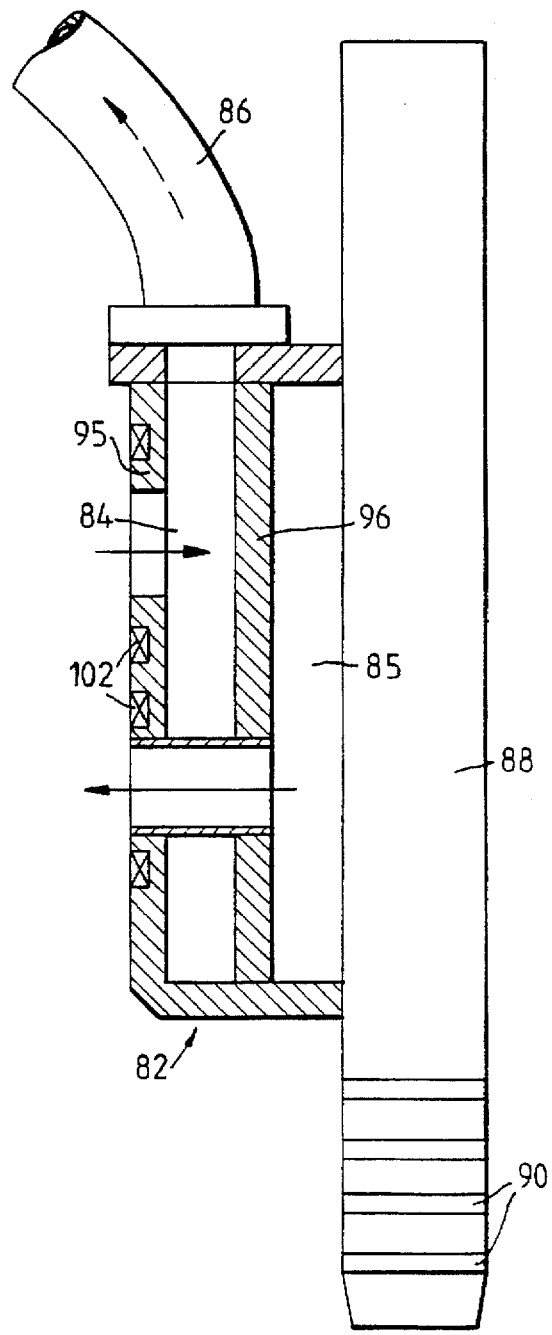
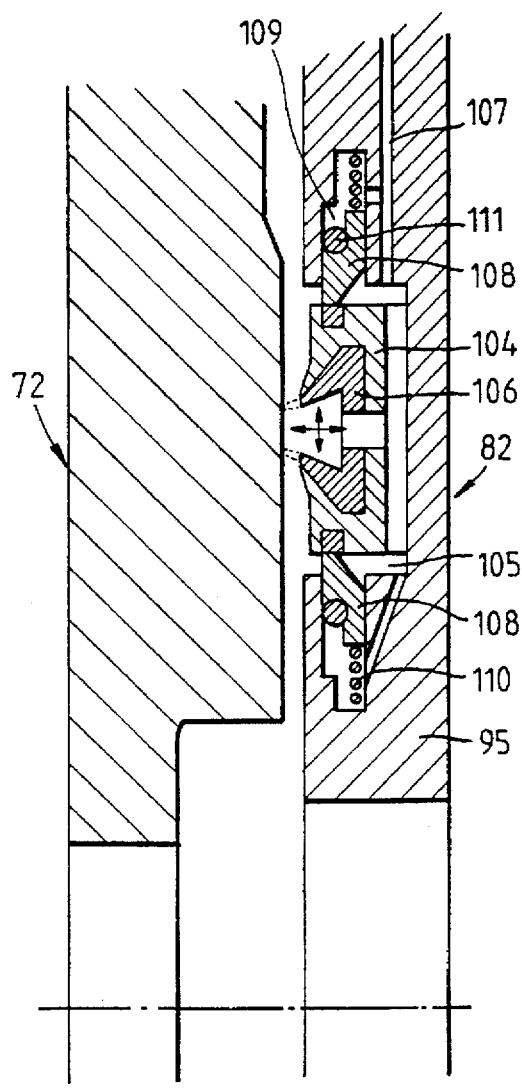

SYSTEM FOR OFFSHORE PRODUCTION OF HYDROCARBONS

BACKGROUND OF THE INVENTION

The present invention relates to a system for offshore production of hydrocarbons by means of a vessel arranged for quick connection to and disconnection from a submerged buoy, wherein the buoy comprises an outer buoyancy member for introduction and releasable securing in a submerged downwardly open receiving space in the vessel, and a centre member rotatably mounted in the outer member and anchored to the sea bed and further connected to at least one riser extending up to the buoy, and wherein a swivel device is arranged at the upper end of the buoy for connection and transfer of process fluid between the risers and a tube system on the vessel.

Different systems of the above-mentioned type are disclosed in the Norwegian patent applications Nos. 922043, 922044 and 922045. These systems are based on the so-called STL system (STL =Submerged Turret Loading) which is disclosed i.a. in the international patent application No. PCT/NO92/00054. In this system a submerged buoy forms a collecting point for one or more flexible risers and umbilicals from e.g. a production system at the sea bed. The buoy is adapted to be raised and secured in the receiving space in the topical vessel, to establish a transport system for the petroleum products from the production system at the sea bed to cargo tanks in the vessel. When the buoy is secured in the receiving space, the vessel is rigidly fastened to the outer buoyancy member of the buoy and is rotatable about the centre member of the buoy which is anchored to the sea bed by means of a suitable anchoring system. Thus, the buoy itself constitutes a rotating body or turret about which the vessel is allowed to turn under the influence of wind, waves and water currents.

Adaptation of the STL system to the use on vessels for production of hydrocarbons involves a number of substantial economical and practical advantages. For a further description of these advantages reference is made to the above-mentioned Norwegian patent applications.

SUMMARY OF THE INVENTION

A general object of the present invention is to further develop a system of the introductorily stated type—which has a coupling means at the bottom of the vessel and avoids large deck-mounted structures—and to provide a system ensuring a quick connection and disconnection and giving maximum security for disconnection under all circumstances.

A further object of the invention is to provide a system having a coupling giving a secure sealing between the topical production fluids and their surroundings.

Another object is to provide a system wherein the coupling between buoy and vessel may be set with large clearances and with a minimal risk for damaging the coupling.

A further object is to provide a system giving the possibility for a simple monitoring of static and dynamic seals, there being used a barrier liquid having a higher pressure than the ambient pressure.

A further object of the invention is to provide a system which is suitable for remotely controlled operation of the swivel device and coupling means in connection therewith.

For the achievement of the above-mentioned objects there is provided a system of the introductorily stated type which, according to the invention, is characterized in that the swivel device comprises a female member and a male member which may be moved to engagement with each other, one member of the swivel device being permanently fastened to the centre member of the buoy and the other member of the swivel device being connected to an operating means on the vessel, so that the male and female members may be connected to and disconnected from each other by means of the operating means, the swivel members in the engaged condition defining common annular spaces communicating with associated fluid paths in the swivel members, and sealing means being provided on each side of the annular spaces, which sealing means, when activated, form a seal between the annular spaces, and can be relieved when mutually disconnecting the swivel members.

A particularly advantageous embodiment of the system according to the invention is characterized in that one of the swivel members on each side of each of the annular spaces is provided with a peripheral annular groove receiving a radially movable ring element which is provided with sealing means for static sealing against the other swivel member and for dynamic sealing between the ring element and the side walls of the peripheral groove. It is further preferred that the sealing means are arranged to be operated hydraulically by means of a barrier liquid having a higher pressure than the ambient pressure, the swivel member having the peripheral groove being provided with a supply channel for the barrier liquid.

The system according to the invention is generally intended for applications wherein the topical riser or risers extends/extend between the buoy and a place for supply of production fluid (well flow). This place may be a production well on the sea bed, but it may also be e.g. a neighbouring platform from which well flow is transferred to a vessel by means of the present system.

BRIEF DESCRIPTION OF THE DRAWING

The invention will be further described below in connection with exemplary embodiments with reference to the accompanying drawings, wherein

FIG. 10 shows a longitudinal sectional view of a part of the male member in the embodiment according to FIG. 8;

FIG. 11 shows an enlarged cross-sectional view of the static and dynamic sealing means in the embodiment according to FIGS. 8–10;

DETAILED DESCRIPTION OF THE PREFERRED EMBODIMENTS

Figure 1:
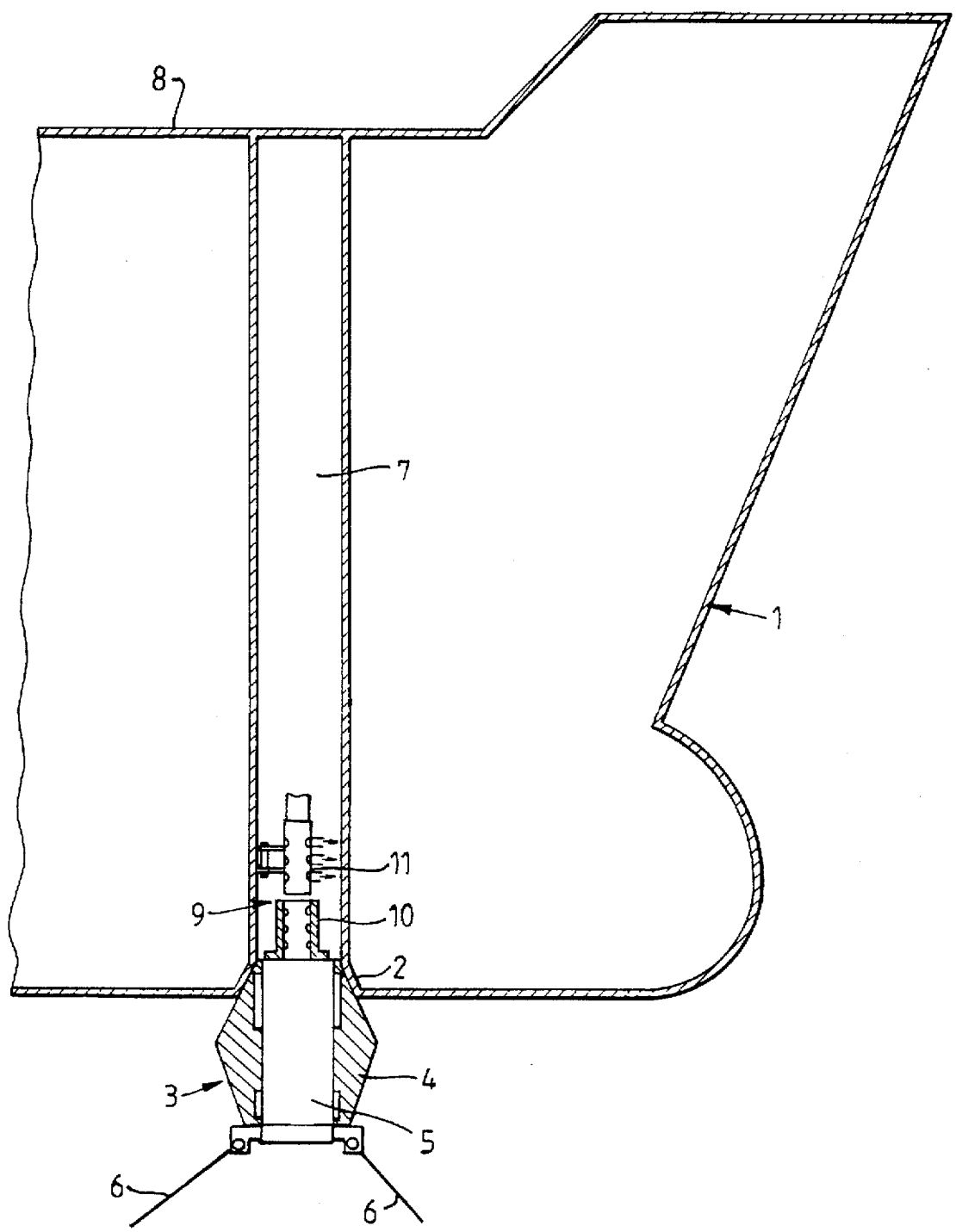
FIG. 1 shows a schematic sectional side view of the forward part of a vessel wherein a buoy is introduced in a receiving space at the bottom of the vessel.

FIG. 1 shows a schematic sectional side view of the bow portion of a vessel 1 which is presupposed to be equipped for working as a production vessel, and which for this purpose is provided with a system according to the invention. The vessel has a downwardly open receiving space 2 wherein there is introduced and secured a buoy 3. The buoy comprises and outer buoyancy member 4 which is releasably secured in the receiving space, and a centre member 5 which is rotatably mounted in the outer member 4 and is anchored to the sea bed or ocean floor by means of anchor lines 6. Above the receiving space 2 the vessel has a shaft 7 extending between the receiving space and the deck 8 of the vessel. At the deck of the vessel there will be arranged a suitable winch (not shown) having a pick-up line which may be lowered into the water through the shaft, for connection with a line from the buoy and hoisting of the buoy when this is to be raised from its submerged position and introduced into the receiving space 2.

In FIG. 1 the system according to the invention is only schematically suggested and is shown to comprise a swivel device 9 having an outer member in the form of a female member 10 which is permanently attached to the centre member 5 of the buoy, and an inner member in the form of a male member 11 which is arranged in the lower end of the shaft 7 and may be lowered into and lifted up from the female member 10 by means of a suitable operating means (not shown), e.g. a hydraulic cylinder. Thus, in principle, the system consists of a bipartite swivel device having a receiving member or female member constituted by a part of the buoy, and an inner member or male member which is arranged on the vessel in order to be connected to or disconnected from the buoy in a quick and reliable manner. When the male member is connected to the female member, the formed swivel device absorbs all relative movements between the vessel and the buoy.

Figure 2:
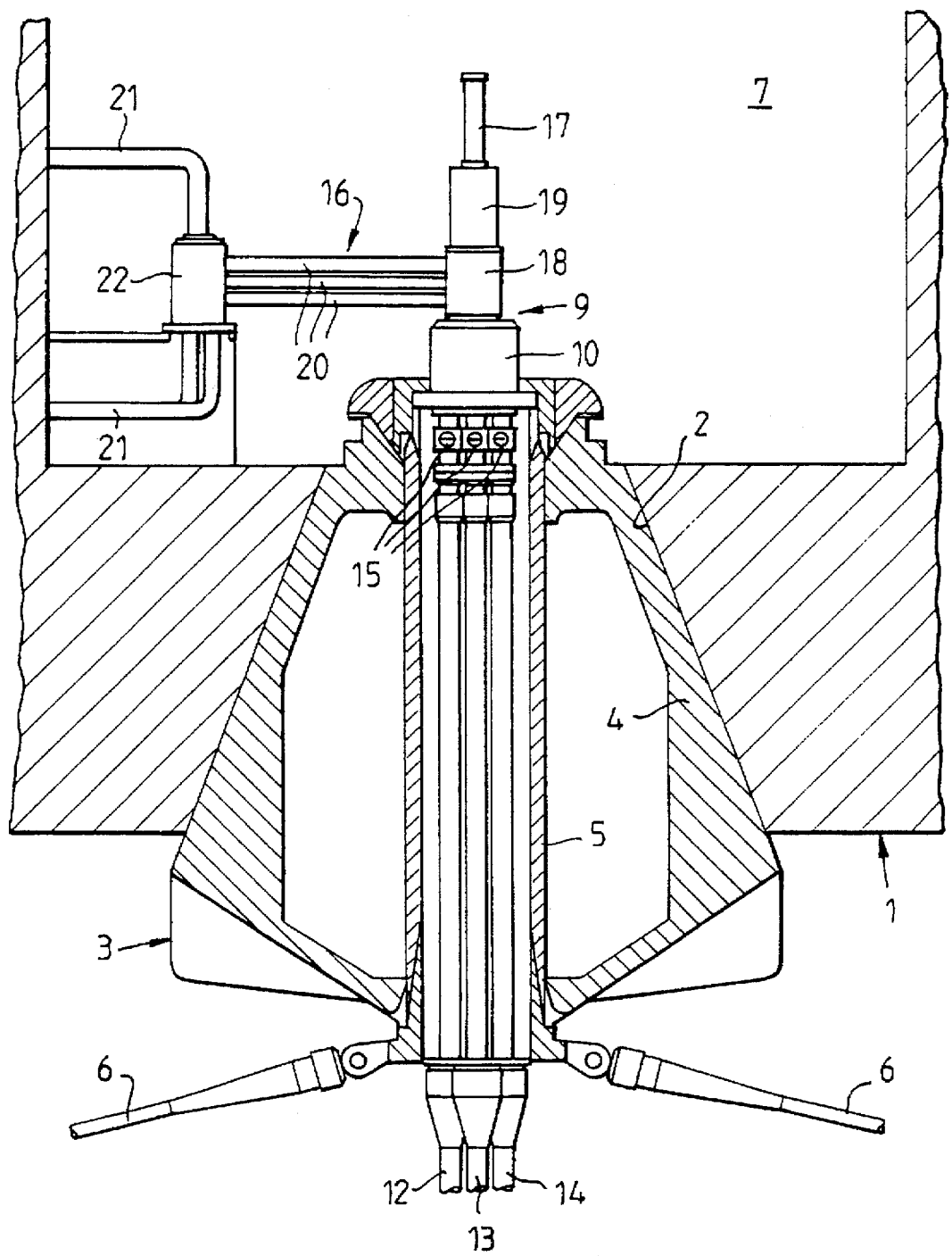
FIG. 2 shows a partly sectioned side view of a buoy in connection with a first embodiment of a system according to the invention.

A survey view of the arrangement in connection with a first embodiment of the system according to the invention is shown in FIG. 2. In the illustrated embodiment three risers 12, 13, 14 for transport of process fluid, e.g. one tube for well flow (hydrocarbons), one tube for water injection and one tube for gas injection, are introduced into the centre member 5 of the buoy 3. The risers are connected through closing valves 15 to respective fluid paths (not shown) in the outer member 10 of the swivel device 9. The inner member or male member 11 of the swivel device (not visible in FIG. 2) is mounted at the free end of an arm means 16 which is pivotably mounted at its other end, so that the male member may be pivoted between a position next to the receiving space 2 of the vessel and a position with the male member centred above the buoy 3. An operating means 17 is arranged for lowering the male member into the female member, or lifting up the male member from the female member, when the arm means 16 is placed with the male member in the centred position. As further shown in FIGS. 3 and 4, the male member 11 is slidably mounted in a guide sleeve 18 which is fastened to the free end of the arm means 16. The guide sleeve 18 supports a housing 19 which is intended for receiving an upper part of the male member when this is in the lifted position, and which supports the operating means 17. The arm means 16 comprises channels or tubes 20 communicating with the swivel device 9 via the guide sleeve 18, and further communicating with a tube system for process fluids arranged on the vessel, a rotating coupling 22 constructed for this purpose, and simultaneously forming the supporting means of the arm means, being arranged at the rotatably mounted end of the arm means.

Figure 3:
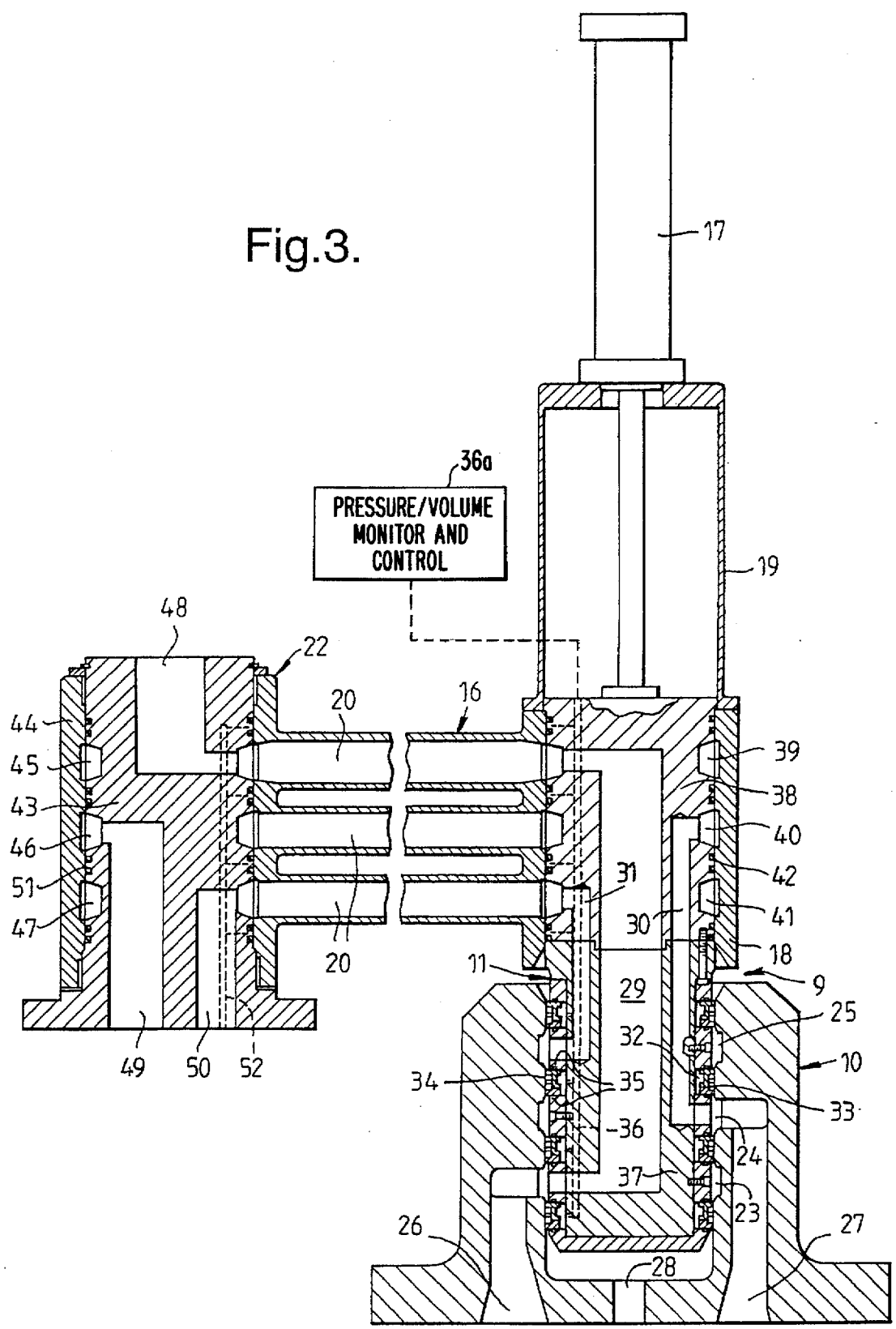
FIG. 3 shows an enlarged side view of the system in FIG. 2 in connected condition.
Figure 4:
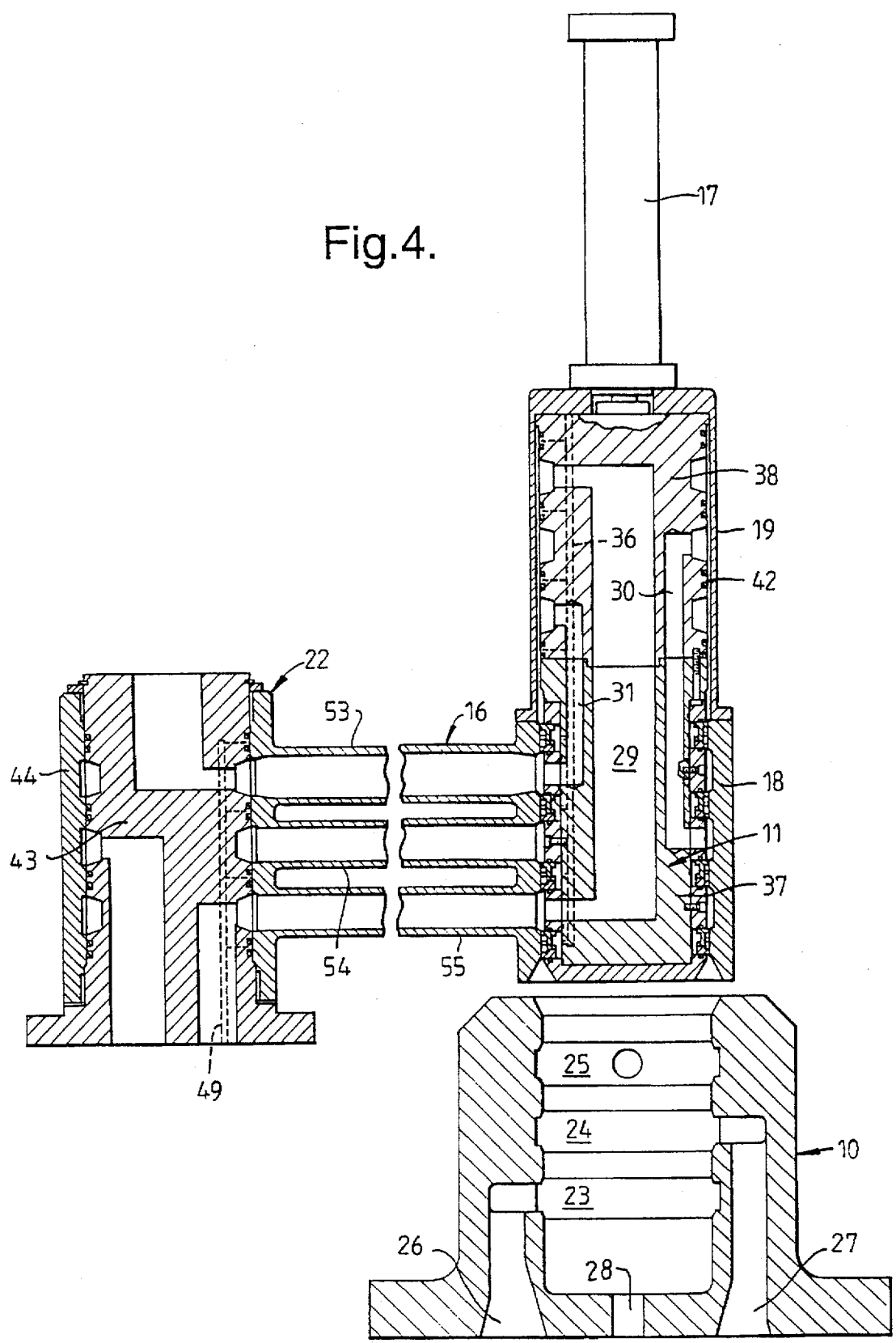
FIG. 4 shows a sectional view corresponding to that of FIG. 3, but of the system in disconnected condition.

The system in FIG. 2 is shown more in detail in FIGS. 3 and 4 wherein the female member 10 and the male member 11 of the swivel device are shown in connected condition or operating position in FIG. 3, and in disconnected condition in FIG. 4. In connected condition the swivel members 10, 11 in a conventional manner form common annular spaces communicating with associated fluid paths in the swivel members. The number of annular spaces and fluid paths correspond to the number of risers used in the actual case. Thus, in the illustrated example with three risers, there are arranged three annular spaces 23, 24, 25, for example for well flow, water injection and gas injection, respectively, the annular spaces communicating with a separate one of three fluid paths 26, 27, 28 in the female member 10, and with a separate one of three fluid paths 29, 30, 31 in the male member 11. In the illustrated case the annular spaces are made up of peripheral ring channels formed in the female member 10. Alternatively, however, they may be formed in the inner member or male member 11, or also in both members, for example for forming annular spaces having a generally circular cross-section.

On each side of each of the annular spaces the male member 11 is provided with a peripheral ring groove 32 receiving a radially movable ring element 33. The ring element is provided with sealing means 34, 35 arranged respectively for static sealing against the female member and for dynamic sealing between the ring element 33 and the side walls of the peripheral ring groove. These sealing means can be activated for forming a seal between the annular spaces during operation, and can be relieved in case of mutual disconnection of the swivel members 10, 11. The sealing means suitably are arranged to be operated hydraulically by means of a barrier liquid having a higher pressure than the ambient pressure, i.e. the pressure of the topical process fluids. The barrier fluid is supplied through a suitable supply channel 36 arranged in the swivel member which is provided with the ring grooves 32, i.e. in the illustrated case the male member 11. As shown more clearly in FIG. 7, the supply channel 36 for the barrier liquid debouches into a buffer volume which is delimited by the bottom area of the ring groove 32 and the associated ring element 33, and which communicates with the sealing means 34 and 35 of the ring element. The structure and manner of operation of the sealing means will be further described below with reference to FIG. 7.

By means of this ring element structure there is achieved that the ring elements 33 centre themselves in the female member within relatively large tolerances, e.g. ±12 mm. This is possible since the ring element or ring elements may float freely in the radial direction and thus may absorb possible centre deviations or centre displacements between the female member and the male member.

As mentioned above, the male member 11 is slidably mounted in the guide sleeve 18 which is fastened to the free end of the arm means 16. The male member comprises a lower stab-in part 37 and a top part 38, and the top part is located in the guide sleeve 18 when the stab-in part is introduced into the female member 10, as appears from FIG. 3. In this position the guide sleeve 18 and the top part 38 define three common annular spaces 39, 40, 41 communicating with respective ones of the fluid paths 29, 30, 31 of the male member 11 and with the channels 20 of the arm means 16, the guide sleeve 18 having through holes between the annular spaces and the associated channels. Between the annular spaces the top part 38 is provided with hydraulically actuated, static sealing means 42 which correspond to the sealing means 34 and which are activated by the barrier fluid through the supply channel 36.

It is to be remarked that the only relative movement between the male member 11 and the guide sleeve 18 is axial. The movement takes place only during connection and disconnection of the male member and the female member. During this operation the internal barrier liquid pressure is low, and the sealing system is relieved.

As appears from FIG. 4, the top part 38 of the male member is located in the housing 19 supported by the guide sleeve 18 when the stab-in part 37 of the male member is pulled up from the female member 10 by means of the operating means 17. Thus, the entire male member 11 in this position is protected by the guide sleeve 18 and the housing 19.

The operating means 17 suitably is a hydraulic actuator, e.g. a cylinder/piston rod unit as shown.

The rotating coupling 22 which is arranged at the rotatably mounted end of the arm means 16, comprises a stationary inner member 43 which is rigidly fastened to the vessel, and an outer member 44 rotatably arranged thereon and fastened to the adjacent end of the arm means 16. The outer member 44 is in the form of a sleeve which structurally correspond to the guide sleeve 18. The inner and outer members define common annular spaces 45, 46, 47 communicating with the channels 20 of the arm means 16 and with respective fluid paths 48, 49, 50 arranged in the inner member 43 and communicating with the tube system 21 of the vessel (see FIG. 2). On each side of the annular spaces 45, 46, 47 there are arranged hydraulically actuated, static seals 51 corresponding to the sealing means 34 and which are activated by the barrier liquid through a supply channel 52 in the inner member. The supply channel 52 as well as the channel 36 are connected, in a way not further shown, to a supply for barrier liquid (not shown).

The channels 20 of the arm means 16 suitably may be formed by a number of tubes 53, 54, 55 which at their ends are fastened in a suitable manner, e.g. by welding, to the guide sleeve 18 and the outer member 44 of the rotating coupling 22, respectively.

Figure 5:
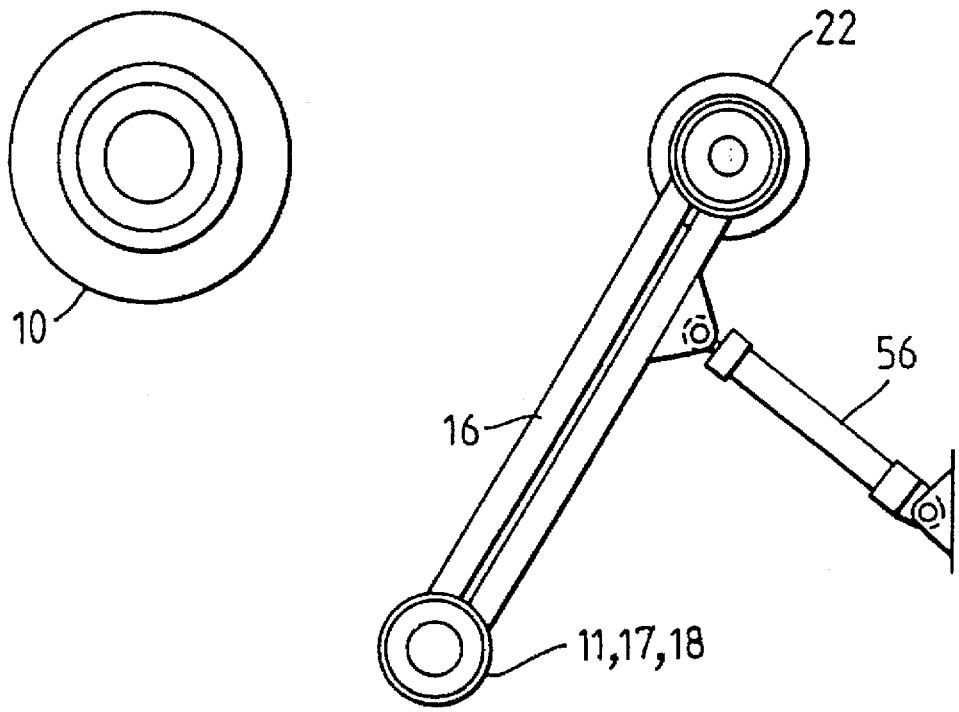
FIGS. 5 and 6 show plan views of an actuator for turning of parts of the system between a storage position and an operating position.
Figure 6:
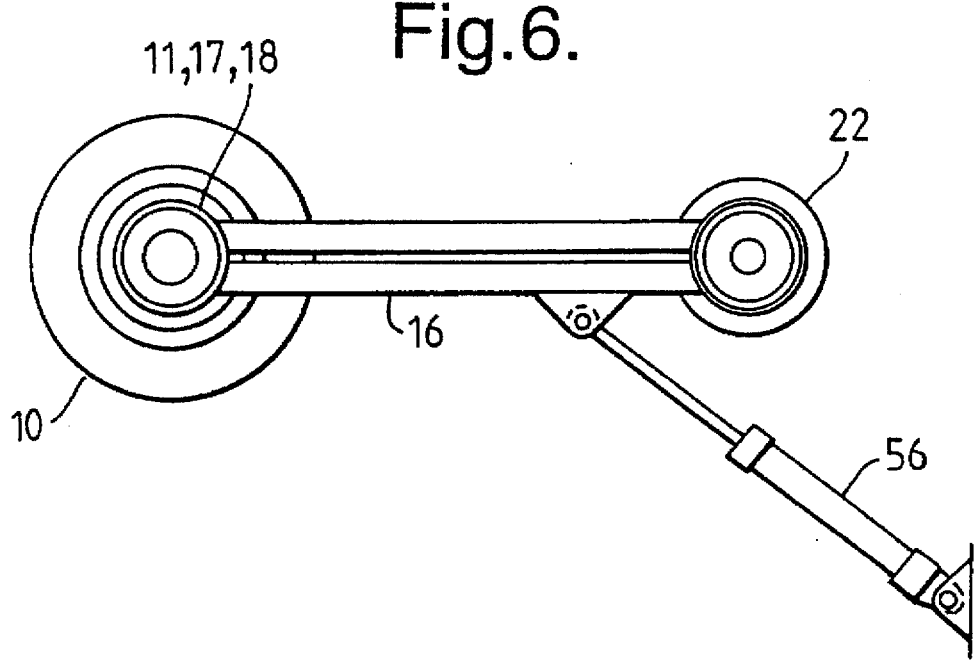

When the male member 11 is disconnected from the female member 10, it may be pivoted aside and up against the wall of the shaft 7 by means of the arm means 16 and the rotating coupling 22, in order to empty or liberate the central area of the receiving space 2, with a view to later pulling-in of a buoy into the receiving space. For pivoting of the arm means there is arranged a suitable actuator, e.g. a hydraulic cylinder/piston unit 56, as shown in FIGS. 5 and 6.

When the male member is disconnected and lifted up from the female member 10, the female member is left open and unprotected. Before the buoy is released from the vessel and dropped from the receiving space, it is therefore advantageous to place a protecting plug in the female member, in order to protect coupling surfaces, prevent fouling and leakage, etc. Such a protecting plug may be placed or removed by using the same principle as that used for the swivel device, or the operations may be carried out manually if sufficient time is available.

Figure 7:
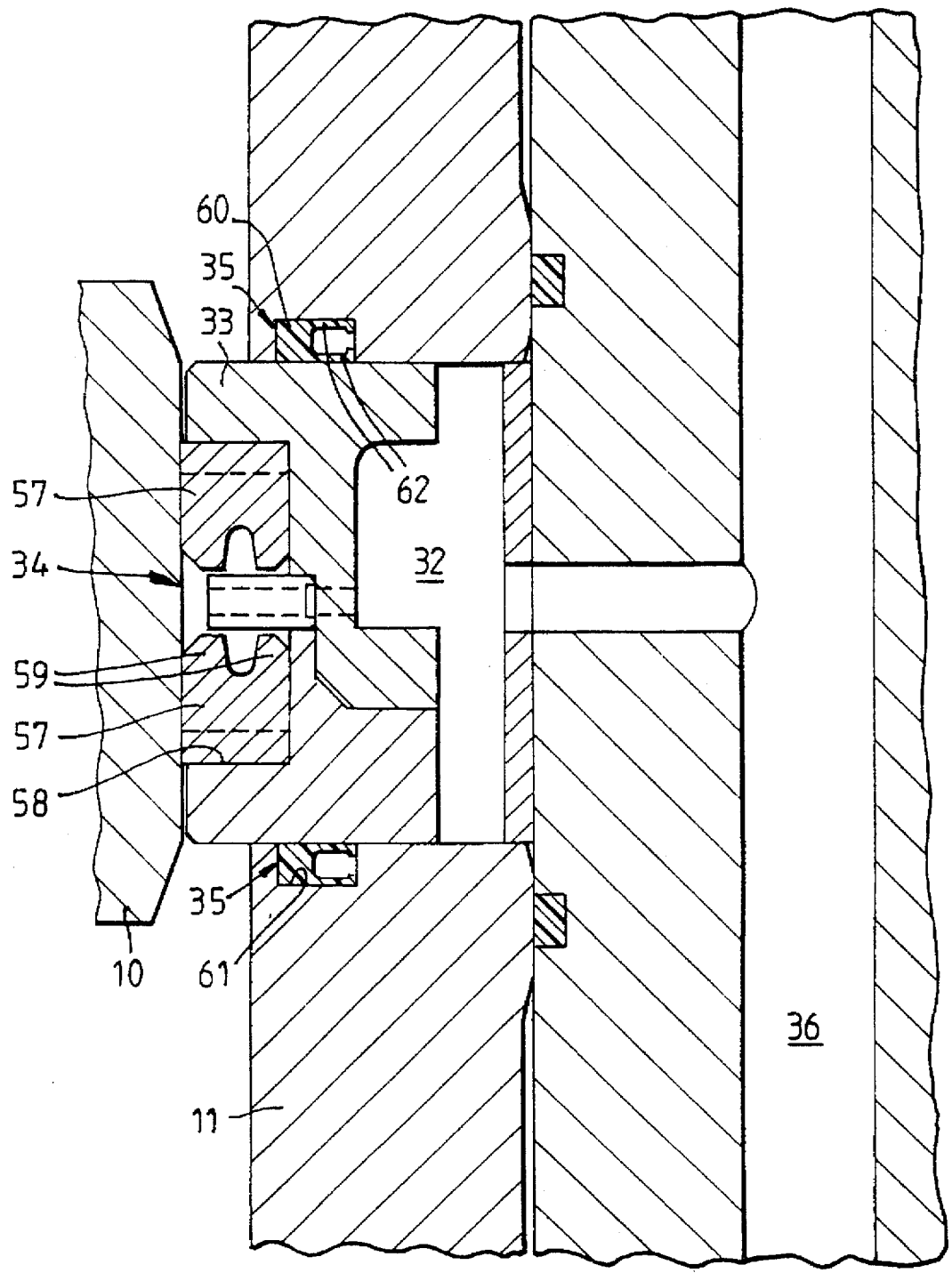
FIG. 7 shows an enlarged cross-sectional view of the static and dynamic sealing means in the embodiment according to FIGS. 2–4.

An embodiment of the static and dynamic sealing means 34, 35 of the system is shown in FIG. 7. The figure shows a segment of the female member 10 and the stab-in part 37 of the male member 11, with the members in connected position and shown in longitudinal section through the axis of the swivel device, as in FIG. 3.

The static sealing means 34 consists of a pair of U-formed lip seals 57 placed in a peripheral groove 58 in the ring element 33 which may also be called a static seal housing. The ring element consists of a pair of steel rings which are assembled and fixed to each other as shown in FIG. 7, so that the sealing elements may be placed in the groove 58 before the steel rings are mounted to each other. The U-formed lip seals consist of a suitable elastomeric material and have axially directed legs 59, wherein the outer leg under the influence of the barrier liquid is pressed outwards to frictionally locking engagement with the opposite sealing surface of the female member 10. As mentioned, the barrier liquid is supplied through the channel 36 and the buffer volume at the bottom of the ring groove 32, the ring element 33 being provided with suitable openings for this purpose.

The dynamic sealing means 35 also consists of a pair of elastomeric U-shaped lip seals 60, but these sealing elements are placed in separate ring grooves 61 in the side walls of the peripheral ring groove 32, as they are to form a seal between the ring element 33 and the adjacent portion of the male member 11 in case of rotation thereof in the female member. The U-shaped sealing elements 60 have radially directed legs 62 which, under the influence of the barrier liquid, are pressed to dynamic sealing against the ring element 33 and the ring grooves 61, respectively.

The elastomeric sealing elements 57, 60 in practice will be provided with embedded supporting rings, to prevent extrusion of sealing element material between mutually adjacent sealing surfaces, under pressure influence from the barrier liquid.

The other static sealing means 42 and 51, which are arranged in the top part 38 of the male member 11 and in the inner member 43 of the rotating coupling 22, respectively, are constructed in a manner corresponding to that of the static sealing means 34.

When the male member and the female member are in connected position, the ring elements 33 have, as mentioned, centred themselves within the female member, the ring elements being freely movable in the radial direction. The barrier liquid (e.g. hydraulic oil or water) is pressurized, and the barrier liquid pressure forces the static sealing elements 57 to expand against the sealing surface of the female member and locks the ring elements or seal housings in their position. As regards the dynamic sealing, the male member and the sealing element in common are hydraulically balanced. A little gap between the sealing surfaces of the ring element 33 and the ring groove 32 leads barrier liquid to the dynamic seal. The pressure difference between the barrier liquid and the process fluid brings the dynamic seal into firm contact with the sealing surface of the ring element.

Thus, when the sealing means 34 and 35 are activated, the static sealing elements 57 lock the ring elements 33 frictionally to the female member 10, whereas the ring elements 33 and the adjacent side walls of the ring grooves 32 form mutually movable sliding surfaces which are sealed by means of the dynamic sealing elements 60. For the sealing function of the static seal it is of decisive importance that a firm and strong frictional fastening is obtained between the sealing element and the sealing surface of the female member. Movement between the sealing element and the female member will cause leakage because of the large pressure differences across the seal. The pressure and the frictional coefficient will be decisive, and as sealing material one will choose an elastomeric material giving the greatest possible friction. For the dynamic seal, on the other hand, one will choose an elastomeric material giving a low friction between the sliding surfaces, for achieving a good sealing with a low friction.

When the male member and the female member are to be disconnected from each other, the barrier liquid pressure is relieved, so that the ring elements 33 are no longer locked in their position. The male member now may be pulled out of the female member. Even if the seals during this operation are relieved, they are still in contact with their sealing surfaces.

By utilizing a barrier liquid having a higher pressure than the fluid against which it is to be sealed (e.g. a 10 bars higher pressure), there is obtained a controlled liquid path from a clean to a "dirty" medium. One can control the leakage direction, and the sealing surfaces can be protected by allowing very small quantities of clean barrier liquid to leak out into the topical process fluid. Thus, by controlling the volume and/or the pressure of the barrier liquid over time, for example, via pressure/volume monitor and control 36a shown in FIG. 3 one may continuously monitor the seals of the swivel.

Figure 8:
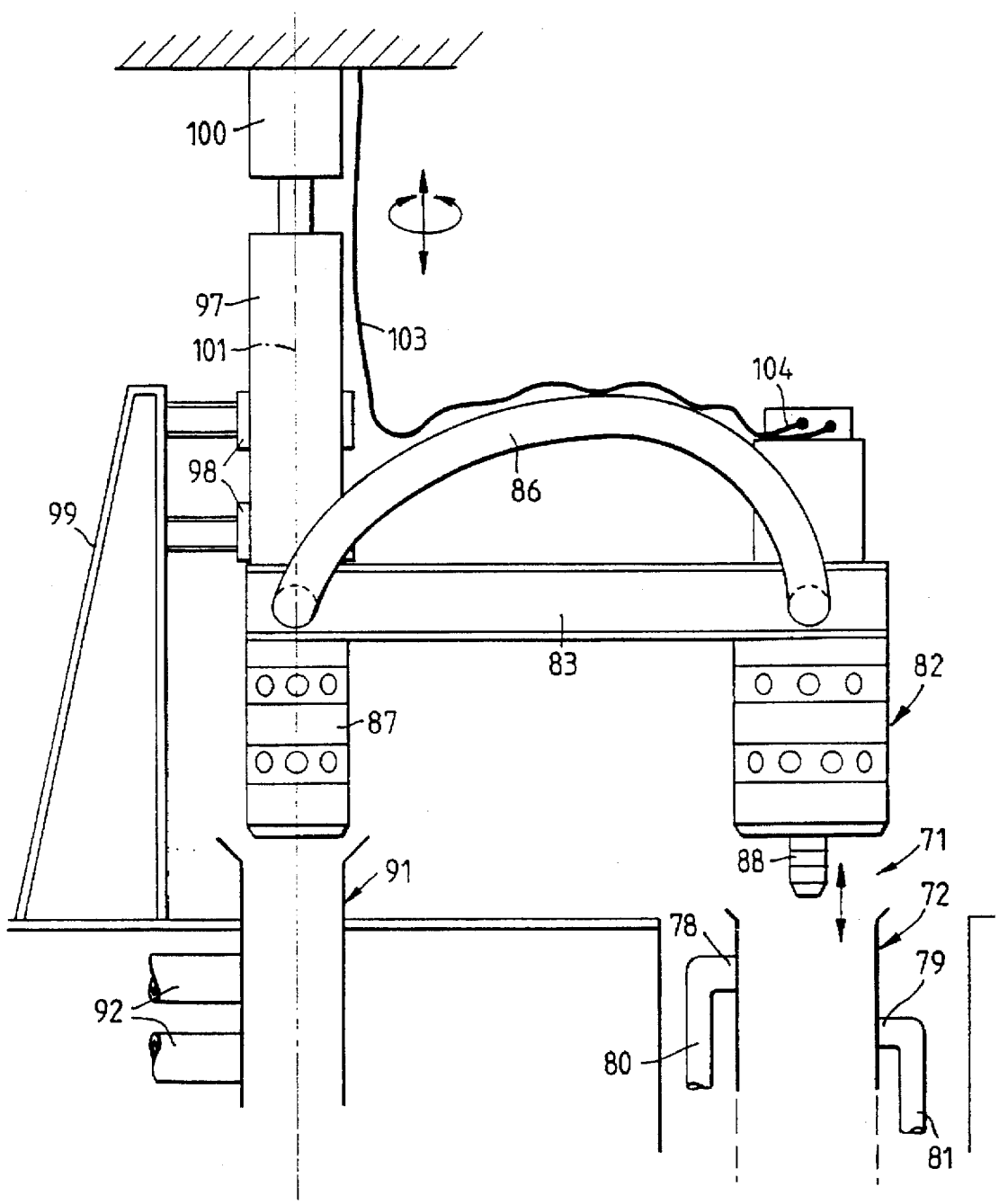
FIG. 8 shows a schematic, partly sectioned side view of a second embodiment of a system according to the invention.
Figure 9:
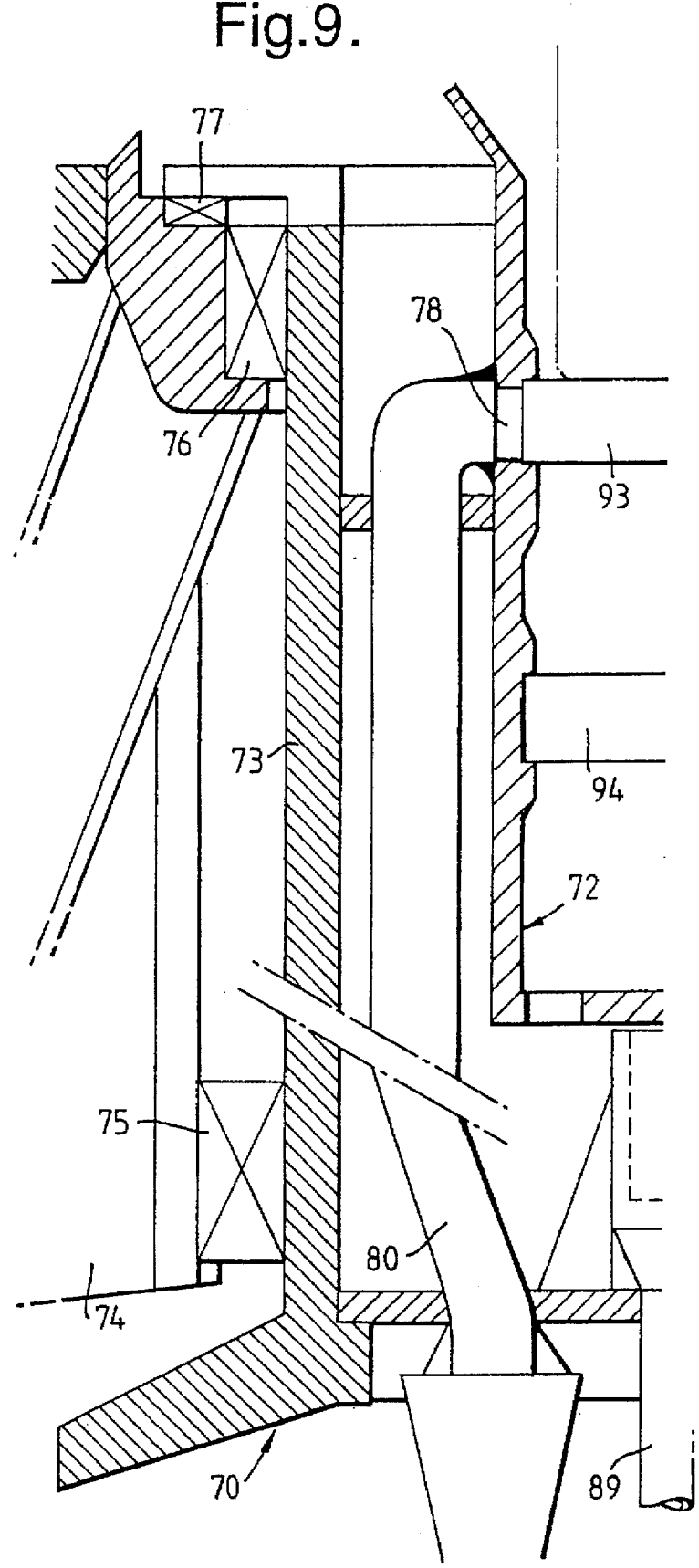
FIG. 9 shows a fragmentary, longitudinal sectional view of the arrangement in the buoy in the embodiment according to FIG. 8.

A second embodiment of the system according to the invention is shown in FIG. 8–10. This embodiment and the embodiment according to FIGS. 2–4 correspond to each other with respect to the female member and the stab-in part of the male member of the swivel device, but the structural solution is different as regards the arrangement for manipulating the male member, and the means for transfer of process fluids between the swivel device and the tube system of the vessel.

In the embodiment according to FIGS. 8–10, the swivel device 71 comprises a female member 72 which, in FIG. 9, is shown to be fastened to—and more specifically mounted in—the centre member 73 of a buoy 70 which is releasably secured in the receiving space in the topical vessel. The buoy is schematically shown to comprise an outer buoyancy member 74 wherein the centre member 73 is mounted by means of a pair of radial bearings 75, 76 and an axial bearing 77. The female member 72 comprises a pair of fluid paths 78, 79 which are connected to respective risers 80, 81 introduced into the buoy.

A male member 82 is rigidly fastened to the free end of an arm means 83, and its fluid paths 84, 85 (see FIG. 10) are connected to respective tubes 86 (only one tube shown) extending along the arm means 83 to inner fluid paths in a coupling member or coupling plug 87 which is rigidly fastened to the rotatably mounted end of the arm means. The male member is also provided with an umbilical coupling comprising a centrally placed plug member 88 intended for interconnection with an umbilical riser 89 which is also coupled to the buoy 70. The umbilical or control cable contains the necessary electric and hydraulic control lines which are connected through electric contact ribbons 90 and hydraulic couplings (not shown) at the lower end of the plug member 88.

It is to be remarked that an umbilical coupling having a suitable umbilical plug member in practice normally also will be arranged in connection with the swivel embodiment according to FIGS. 2–4. The plug member then will be arranged at the lower edge of the male member, for connection at a corresponding coupling point in the female member.

It is also to be remarked that the embodiment in FIG. 9 is constructed so that the risers together with the female member 72 may be pulled up through the centre member of the buoy and into the vessel. This will be advantageous for maintenance purposes.

The system further comprises a device for lifting of the arm means 83 with the male member 82 and the coupling member 87 as a unit, and for rotation of said unit in the lifted position, so that the male member may be pivoted between a position at the side of the receiving space of the vessel and a position centred above the buoy. In the lowered position in which the male member 82 is connected to the female member 72, the coupling member 87 is placed in a connector in the form of a coupling sleeve 91 for connection of the inner fluid paths (not shown) of the coupling member to the vessel tube system 92 for process fluids.

In the swivel device 71 the male member 72 in a conventional manner is provided with peripheral channels 93, 94 (FIG. 9) for the formation of annular spaces for communication with the fluid paths 84, 85 of the male member (FIG. 10). In a corresponding manner the coupling sleeve 91 is provided with annular spaces (not shown) forming a connection between the fluid paths of the coupling member 87 and the tube system 92 of the vessel. As shown in FIG. 10, the fluid paths 84, 85 of the male member 82 are delimited inside of concentric tube elements 95, 96, these fluid paths communicating with the associated annular spaces 93, 94 of the female member through openings in the tube walls. The fluid paths of the coupling member 87 may be formed in a corresponding manner.

Such as will be clear from a consideration of FIG. 10, the length and diameter of the male member may be significantly reduced if only one medium is to be transferred.

For lifting, lowering and turning of the arm means 83 with the male member 82 and the coupling member 87, the arm means at the rotatably mounted end is provided with an upright shaft member 97 which is rotatably and axially slidably mounted in a bearing means 98. The bearing means 98 is arranged in a rack 99 which is suitably supported on the vessel. For lifting and lowering of the arm means and the elements supported thereby, the shaft member 97 is coupled to a hydraulically driven manipulator 100 which may have a predetermined up/down movement. For the horizontal pivoting or turning movement of the arm means, there may suitably be arranged a separate actuator (not shown), e.g. a hydraulic cylinder/piston means of a similar embodiment as the actuator 56 in FIGS. 5 and 6.

In the illustrated embodiment the axis of rotation 101 of the shaft member 97 and therewith of the arm means 83 is concentric with the longitudinal axis of the coupling member 87 and therewith of the coupling sleeve 91. This coaxial arrangement may be advantageous when geometrical and/or dimensioning-related reasons dictate a placing of the rotating shaft at the opposite end of the arm means in relation to the male member 82. It may, however, also be conceivable to place the axis of rotation of the arm at a suitable place between the male member and the coupling member, as this may give an advantageous balancing of the arm means and the elements supported thereby, and therewith reduced load moments and load forces on i.a. the bearing means 98.

The swivel device 71 in the system according to FIGS. 8–10 is constructed in a manner corresponding to that of the previously described embodiment, both with respect to radially movable ring elements for absorption of relatively large tolerances and centre deviations, and with respect to static and dynamic sealing means which are activated by means of a barrier liquid having a higher pressure than the ambient pressure. Therefore, it is here referred to the previous description as regards the general construction and function of these means, and of the advantages obtained.

Also in the second embodiment, the combined ring element and sealing assemblies are arranged in the male member, for placing on each side of the annular spaces 93 and 94 of the female member 72 when the male member is introduced into the female member. In FIG. 10 these assemblies are only illustrated schematically as blocks 102. Barrier liquid to these assemblies is supplied through a non-illustrated supply channel communicating with the line 103 for barrier liquid shown in FIG. 8. (This line is shown partly coinciding with an umbilical line 104 connected at the top of the male member 82.) Barrier liquid is supplied also via a non-illustrated supply line to static sealing means arranged in the coupling member 87, in a manner corresponding in principle to that of the top part 38 of the male member 11 in the embodiment according to FIGS. 2–4.

An alternative embodiment of a ring element and sealing assembly is shown in FIG. 11. In the figure, interspace distances and clearances between individual elements are shown partly strongly exaggerated for the sake of clarity. In this embodiment a radially movable ring element 104 is arranged in a peripheral ring groove 105 in the tube element 95 of the male member. In the ring element there is placed a static sealing means in the form of a U-shaped lip seal element 106 having lips which are directed towards the adjacent sealing surface of the female member 72. Barrier liquid is supplied via a channel 107 to a buffer volume at the bottom of the ring groove 105. When the barrier liquid is pressurized, the sealing lips are pressed outwards to frictionally locking engagement with the opposite sealing surface of the female member.

The dynamic sealing means here consists of a pair of sealing elements 108 which are sealingly placed in respective ring grooves 109 at each side of the ring element 104, in sealing engagement with an adjacent sealing surface of the ring element. As shown, each ring groove 109 is connected to the supply channel 107 for barrier liquid, and in the bottom portion of the ring groove there is also placed a pressure spring 110 acting on the sealing element in addition to the pressure from the barrier liquid. Each sealing element 108 is also influenced and retained by an O-ring 111 placed in the ring groove. With a suitable choice of O-ring diameter, spring pressure etc., the sealing pressure may be balanced so that an optimum dynamic sealing function is achieved.

As will be appreciated, the manner of operation and the functional properties of the embodiment in FIG. 11 in all essentials are the same as those of the previously described embodiments, and in this respect it is therefore referred to the previous description.

Figure 12:
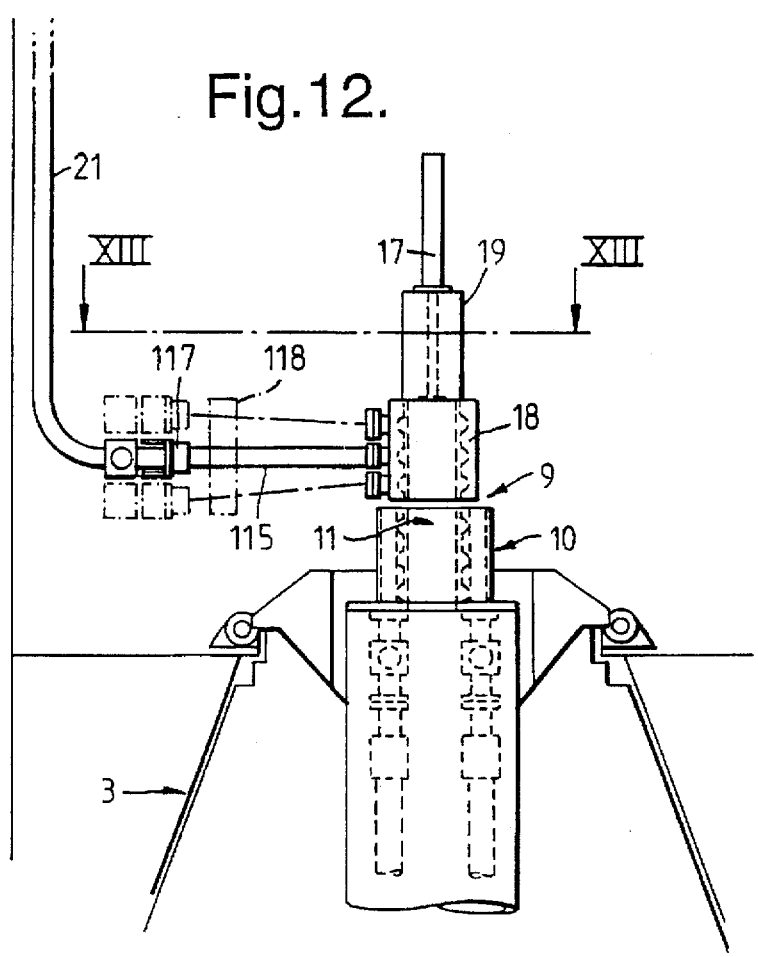
FIG. 12 shows a schematic, partly sectioned side view of an embodiment which in principle corresponds to the embodiment according to FIGS. 2–4, but which uses another embodiment of the arm means and the means for connection to the tube system of the vessel.
Figure 13:
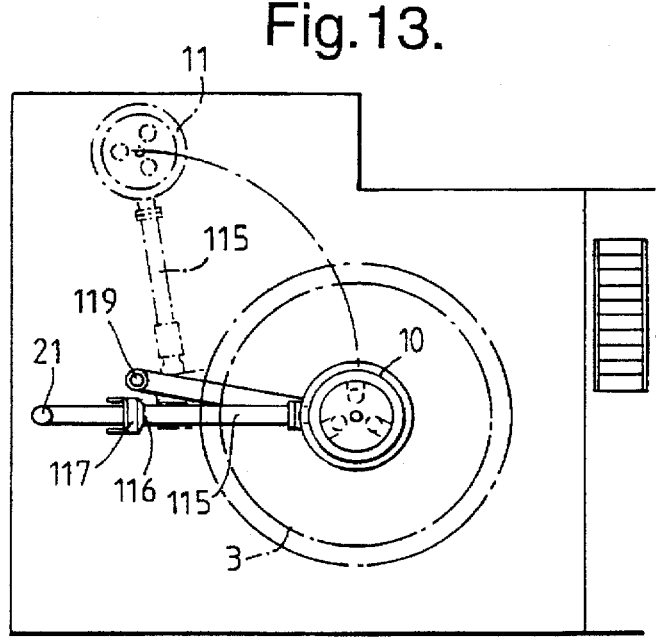
FIG. 13 shows a schematic plan view along the line XIII—XIII in FIG. 12.

In the previously described embodiments, that end of the arm means of the system located opposite to the swivel device, is coupled either to a rotating coupling or to a coupling member which are specially constructed and provided with fluid paths for the provision of a connection between the conduits of the arm means and the tube system of the vessel. An alternative solution for the provision of said connection is shown in FIGS. 12 and 13. The embodiment in principle corresponds to the embodiment according to FIGS. 2–4, apart from the rotating coupling 22, and corresponding elements therefore are designated by the same reference numerals as in FIGS. 2–4. In this embodiment the arm means comprises a number of tubes 115 which, at their rotatably mounted end, are provided with respective flange couplings 116 for detachable connection with associated connectors 117 at the ends of tubes connected to the tube system 21 of the vessel. The connectors 117 may be of a commercially available type, e.g. so-called "Collet" connectors. The tubes 115 are supported by a suitable supporting means 118 and are pivotally mounted about a fulcrum 119. By means of a non-illustrated actuator the tubes 115 with the male member 11 and the other elements may be pivoted aside to the position shown with dashed lines in FIG. 13, when the tubes have been disconnected from the connectors.

What is claimed is:

1. A system for offshore production of hydrocarbons by means of a vessel arranged for quick connection to and disconnection from a submerged buoy, wherein the buoy comprises an outer buoyancy member for introduction and releasable securing in a submerged downwardly open receiving space in the vessel, and a center member rotatably mounted in said outer member and adapted to be anchored to a sea bed and further connected to at least one riser extending up to the buoy, and wherein a swivel device is arranged at the upper end of the buoy, which swivel device comprises a pair of coaxial swivel members defining common annular spaces communicating with associated fluid paths in said swivel members, for transferring process fluid between said at least one riser and a tube system on the vessel, wherein said swivel members are each formed as a female member and a male member which can be inserted axially into or withdrawn from each other, one of said swivel members being permanently fastened to the center member of the buoy and said other member being connected to an operating means on the vessel, so that said swivel members may be connected to and disconnected from each other by said operating means, said swivel members in the connected condition defining said annular spaces, sealing means being provided on each side of said annular spaces, which sealing means can be activated to form a seal between said annular spaces, and can be relieved when mutually disconnecting said swivel members.

2. A system according to claim 1, wherein one of said swivel members on each side of each of said annular spaces is provided with a peripheral ring groove receiving a radially movable ring element having associated sealing means, said sealing means are arranged for static sealing against said other swivel member and for dynamic sealing between said ring element and said side walls of the peripheral ring groove, said sealing means being arranged to be operated hydraulically by means of a barrier liquid having a higher pressure than the ambient pressure, said swivel member having said peripheral ring grooves being provided with a supply channel for the barrier liquid.

3. A system according to claim 2, wherein said male member is mounted by a pivotal support at a distance from said end, so that said male member may be pivoted by said arm means between a position at the side of said receiving space of the vessel and a position with said male member centered above the buoy, so that said operating means can raise or lower said male member in relation to the buoy when said arm means is placed with said male member in the centered position.

4. A system according to claim 3, wherein said male member is slidably mounted in a guide sleeve fastened to said one end of said arm means, said male member comprising a lower stab-in part and a top part wherein said top part is situated in said guide sleeve when said stab-in part is inserted in said female member, and said guide sleeve and said top part in this position defining common annular spaces communicating with the fluid paths of said male member and with channels extending along said arm means and communicating with the tube system of the vessel.

5. A system according to claim 4, wherein said top part on each side of said annular spaces is provided with hydraulically actuated, static seals for sealing between said top part and said guide sleeve.

6. A system according to claim 5, wherein said pivotal support of said arm means comprises a rotating coupling comprising a stationary inner member and an outer member rotatably arranged thereon and fastened to said arm means, said static seals are activated by said barrier liquid, said top part and said stationary inner member of said rotating coupling, respectively, being provided with a supply channel for the barrier liquid.

7. A system according to claim 4, wherein at said end of said arm means, there is provided a housing supported by said guide sleeve and into which said top part of said male member may be pulled up when lifting said male member from said female member.

8. A system according to claim 7, wherein said operating means is a hydraulic actuator arranged at a top portion of said housing.

9. A system according to claim 4, wherein said pivotal support of said arm means comprises a rotating coupling comprising a stationary inner member and an outer member rotatably arranged thereon and fastened to said arm means, said inner and outer members defining common annular spaces communicating with said channels of said arm means and with fluid paths in said inner member communicating with the tube system of the vessel.

10. A system according to claim 9, wherein said inner member on each side of said annular spaces is provided with hydraulically actuated static seals for sealing between said inner and said outer member.

11. A system according to claim 9, wherein said arm means consists of a number of tubes which, at their ends, are fastened to said guide sleeve and said outer member of said rotating coupling respectively.

12. A system according to claim 4, wherein said arm means comprises a number of tubes which, at their pivotally mounted ends, are provided with respective flange couplings for detachable connection with associated connectors at the end of tubes in the tube system of the vessel.

13. A system according to claim 3, wherein said male member is rigidly fastened to said end of said arm means and its fluid paths are connected to tubes extending along said arm means to inner fluid paths in a coupling member rigidly fastened to said arm means at a distance from said end, and that a device is provided for raising and lowering said arm means with said male member and said coupling member as a unit, and for rotating said unit in the raised position, said coupling member in the lowered position being placed in a connector for connection of said inner fluid paths of said coupling member to the tube system of the vessel for process fluids.

14. A system according to claim 34, wherein said coupling member is concentric with the axis of rotation of said arm means.

15. A system according to claim 13, wherein said raising and lowering device is a hydraulically driven manipulator having a predetermined up/down movement.

16. A system according to claim 13, further comprising a hydraulic cylinder/piston means for horizontal turning of said arm means.

17. A system according to claim 13, wherein said male member and said coupling member are placed at respective ends of said arm means, and that the axis of rotation of said arm means is situated between said male member and said coupling member.

18. A system according to claim 2, wherein said static sealing means comprises a U-formed lip seal having axially directed inner and outer legs, wherein said outer leg under the influence of the barrier liquid is pressed outwards to frictionally locking engagement with the opposite swivel member.

19. A system according to claim 2, wherein said dynamic sealing means consists of a pair of elastomeric U-shaped lip seals placed in respective ring grooves on each side of said ring element, and having radially directed legs which, under the influence of the barrier liquid, are pressed to provide dynamic sealing against said ring element and said ring groove, respectively.

20. A system according to claim 2, wherein said dynamic sealing means consists of a pair of sealing elements sealingly placed in respective ring grooves on each side of said ring element, the bottom portion of said ring groove being connected to said supply channel for barrier liquid, and a mechanical spring also being placed in the bottom portion of said ring groove, which spring acts upon said sealing element in addition to the pressure from the barrier liquid.

21. A system according to claim 2 wherein it further comprises a means for monitoring the pressure and/or the volume of the barrier liquid.

* * * * *